G. DORFFEL.
WORM DRIVE.
APPLICATION FILED NOV. 14, 1918.

1,336,286.

Patented Apr. 6, 1920.
2 SHEETS—SHEET 1.

WITNESSES
Frank J. Faggiani
A. L. Ritchin

INVENTOR
George Dorffel,
BY
[signature]
ATTORNEYS

G. DORFFEL.
WORM DRIVE.
APPLICATION FILED NOV. 14, 1918.
1,336,286.
Patented Apr. 6, 1920.
2 SHEETS—SHEET 2.
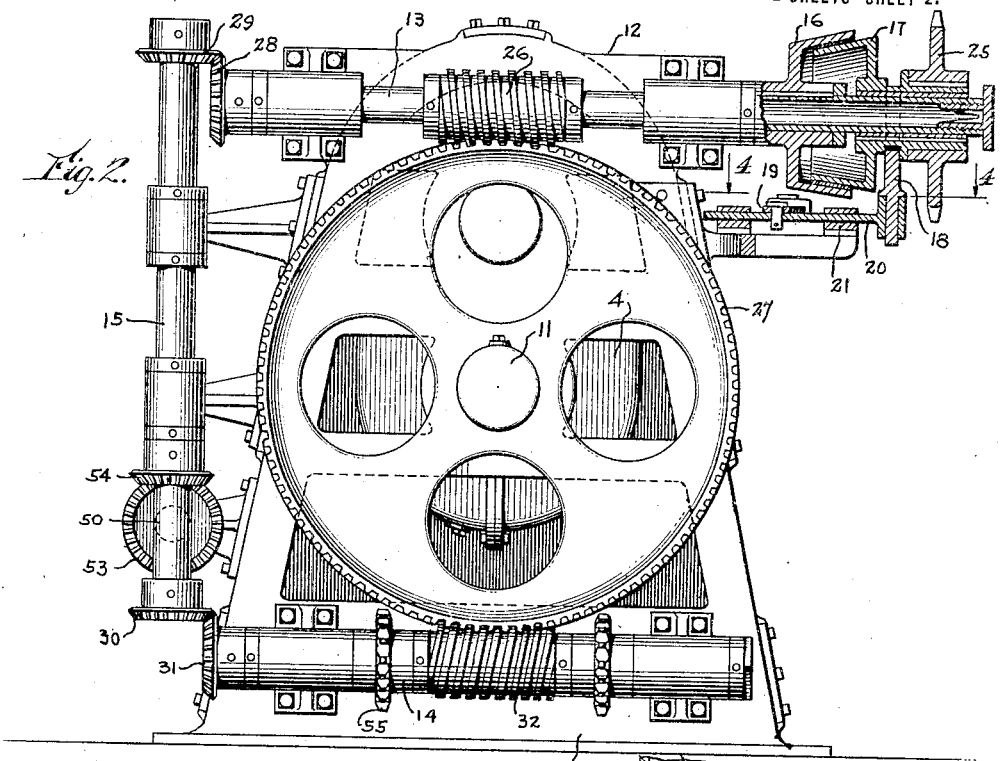
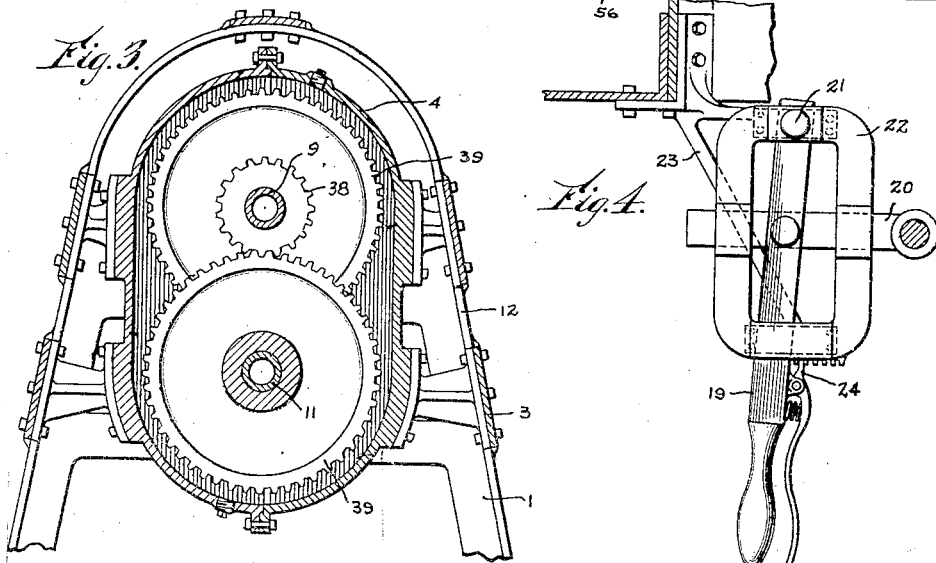
WITNESSES
INVENTOR
George Dorffel.
BY
ATTORNEYS

UNITED STATES PATENT OFFICE.

GEORGE DORFFEL, OF OAKLAND, CALIFORNIA.

WORM-DRIVE.

1,336,286.  Specification of Letters Patent.  Patented Apr. 6, 1920.

Application filed November 14, 1918. Serial No. 262,489.

*To all whom it may concern:*

Be it known that I, GEORGE DORFFEL, a citizen of the United States, and a resident of Oakland, in the county of Alameda and State of California, have invented a new and Improved Worm-Drive, of which the following is a full, clear, and exact description.

This invention relates to an improved driving mechanism and has for an object the provision of an arrangement whereby worms and worm wheels may be used and at the same time a high speed secured.

Another object of the invention is the provision of a worm provided with compensating connecting means whereby the driving mechanism may operate under momentum notwithstanding the use of worms.

A further object of the invention is the provision of a worm drive arranged to secure high speed provided with means for connecting power for hand operated propelling mechanisms.

In the accompanying drawings:

Fig. 2 is an end view of the driving mechanism shown in Fig. 1.

Fig. 3 is a sectional view through Fig. 1 on line 3—3.

Fig. 4 is a fragmentary sectional view through Fig. 2 on line 4—4.

Figure 1:
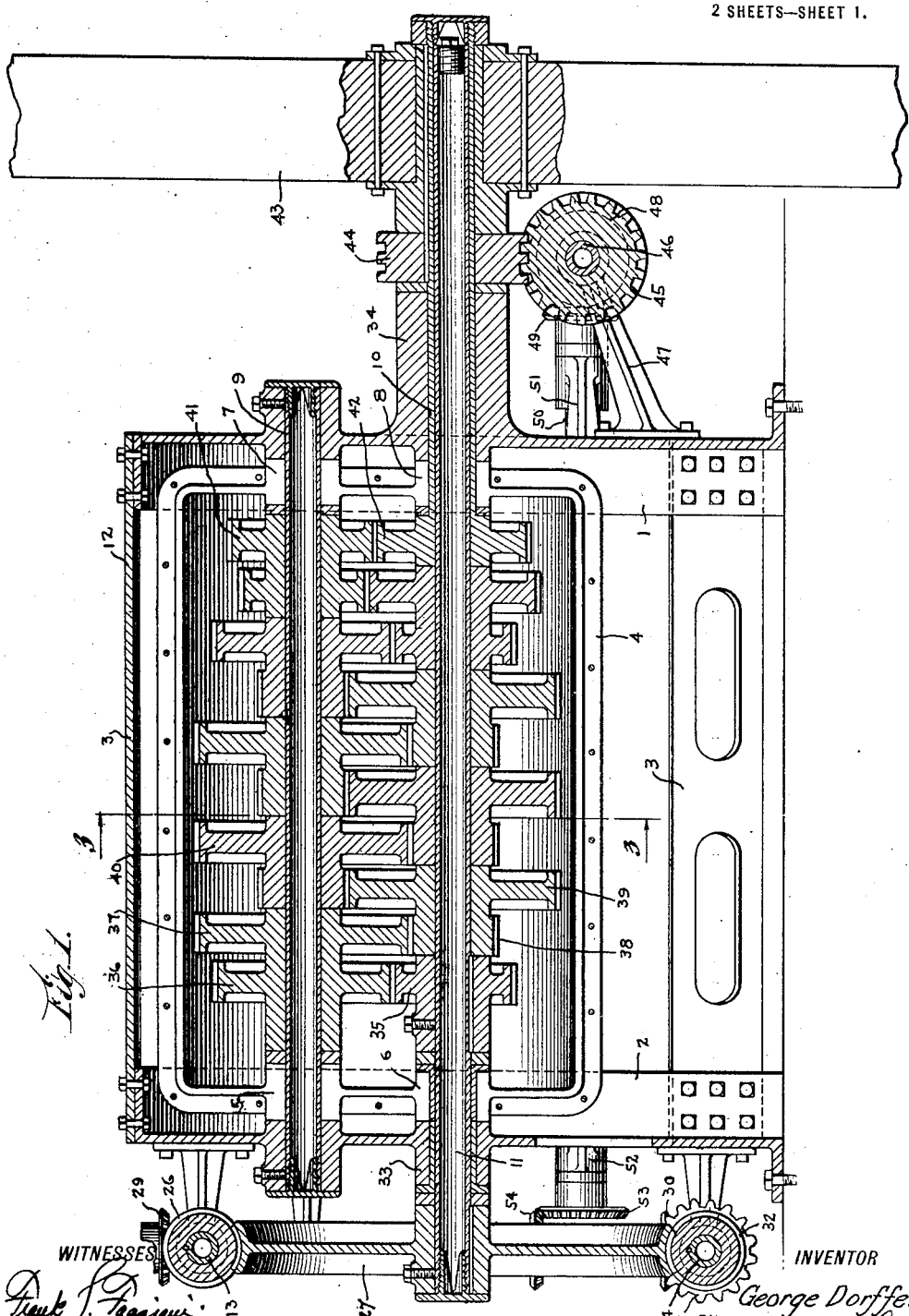
Figure 1 is a longitudinal vertical section through a propelling mechanism disclosing an embodiment of the invention.

Referring to the accompanying drawings by numerals 1 and 2 indicate supporting end members connected by any desired number of plates and connecting members 3 whereby a frame will be provided for supporting the various parts. Arranged in this frame is a casing 4 divided into two parts and bolted or otherwise rigidly secured together, said members being in turn connected with the plates 3 forming part of the frame. In addition the casing 4 is provided with bearing boxes 5, 6, 7 and 8 mounted on the stationary shaft 9, rotatable shaft 10 and the rotatable shaft 11 as clearly indicated in Fig. 1. Arranged exteriorly of the casing 4 and also exteriorly of the frame 12 formed of members 1, 2 and 3 are suitable brackets connected to the frame for supporting journal boxes accommodating the parallel shafts 13 and 14 and the vertical shaft 15. Shaft 13 is provided with a clutch member 16 at one end which coacts with the clutch member 17 operated by a suitable yoke 18 which in turn is operated by handle 19 connected with the link 20. Handle 19 is pivotally mounted at 21 on a suitable frame 22 supported by bracket 23 and is locked in any adjustable position by a spring pressed catch 24. The clutch member 17 is rigidly connected with a sprocket 25 to which power may be connected, same being from any suitable source, as for instance an ordinary internal combustion engine. When the engine is running the clutch member 17 is engaging clutch member 16 and shaft 13 will be rotated and consequently will rotate the worm 26 which is continually meshing with the worm wheel 27 so that said worm wheel and the shaft 11 will be rotated. Shaft 13 is provided with a beveled gear 28 meshing with beveled gear 29 rigidly secured to shaft 15, whereby when shaft 13 is rotated shaft 15 will be rotated at the same speed, gears 28 and 29 being of the same size. Adjacent the lower end of shaft 15 beveled gear 30 is provided, said gear being rigidly secured to shaft 15 and meshing with beveled gear 31 of the same size, which is rigidly secured to shaft 14 so that shaft 14 will be rotated at the same speed as shaft 13. The worm 32 is rigidly secured to shaft 14, said worm continually meshing with the worm wheel 27 whereby said worm wheel will be driven from diametrically opposite sides and thereby a substantially even tension produced and a maximum power for turning shaft 11. Shaft 11 is mounted in a suitable bearing box 33 in the frame 12 adjacent one end and supported by bearing box 34 adjacent the opposite end. This shaft rotates rather slowly, but the movement thereof is conveyed to the gear 35 as it is rigidly secured thereto. This gear meshes with the gear 36 preferably formed integral with the gear 37 which in turn meshes with pinion 38 formed integral with gear 39.

As will be seen from Fig. 1 there are provided a number of sets of pinions and gears 40 similar to the pinion 39 and gear 38. These pinions and gears may be as arranged in Fig. 1 or differently proportioned as desired, but preferably the pinions increase in size and the gears decrease in size as they approach the last pair of gears 41 and 42, said last pair being preferably of the same size. Gear 42 is rigidly secured to shaft 10 though loosely mounted on the shaft 11. Shaft 10 extends through bearing box 34 and is rigidly secured to the propeller 43 as well as to the worm 44. In connection with the gear 35' and gear 42 and other gears in alinement therewith it will be observed that shaft 11 acts as a support therefor, said shaft being hollow. The propeller 43 may be connected in any desired way with the tubular shaft 10 so as to receive power from the gear 42. As shown in Fig. 1 the worm 44 is keyed to the tubular shaft 10 and meshes with the worm wheel 45, said worm wheel being rigidly secured to the shaft 46 and journaled at the end of bracket 47, said shaft carrying the beveled gear 48 meshing with gear 49 carried by shaft 50. Shaft 50 is mounted in suitable journal boxes supported by brackets 51 and 52, said shaft not only having beveled gear 49 rigidly secured thereto, but also a beveled gear 53 secured thereto meshing with beveled gear 54 rigidly secured to shaft 15. By this arrangement the momentum of the tubular shaft 10 and associate parts including propeller 43 will be connected through worm 44, worm wheel 45 and from thence through shaft 10 and beveled gears associated therewith to shaft 15 whereby shaft 15 and all parts operatively connected therewith will be rotated. This operation or movement of parts takes place when the clutch members 16 and 17 are disengaged. When the driving mechanism is used for driving an airplane propeller, or a ship propeller, or in fact any form of device, it would be undesirable to suddenly stop the mechanism by opening the clutch members 16 and 17, which sudden stop would occur by reason of the worms used if the return drive was not provided. In some instances, as for instance in some forms of boats it may be desirable to have a power connected to the driving mechanism, as for instance through the sprocket wheel 25 heretofore described, or it may be desirable to drive the mechanism by hand. When driving by hand suitable hand operated mechanism is connected to the sprocket wheels 55 and 56 for rotating shaft 14, which will, of course, transmit proper movement to worm 32 and worm 26 for rotating the main driving worm wheel 27. A particular speed increasing mechanism has been shown in the casing 4, but it will be evident that more or less gearing may be used without departing from the spirit of the invention. In any event, however, the proportion of increase of speed in hollow shaft 10 over the speed of the worm wheel 27 must be in proper ratio and proportion to the worm 44 and worm wheel 45 and beveled gears associated therewith so that the driving effect of the beveled gear 53 and beveled gear 54 will rotate the shaft 15 at the same speed as said shaft is rotated by shafts 13 and 14.

In respect to the mounting of the various sets of gears on shaft 9 and shaft 11 it will be understood that roller bearings or ball bearings may be provided without departing from the spirit of the invention, or the bearings could be mounted directly on these shafts as illustrated in Fig. 1.

What I claim is:

1. A driving mechanism comprising a driving shaft, speed multiplying mechanism connected with said driving shaft, a driven shaft connected with said speed multiplying mechanism, a worm wheel connected with said driving shaft, a pair of worms meshing with said worm wheel, said worms being on diametrically opposite sides of said worm wheel, and means for simultaneously rotating said worms.

2. A driving mechanism comprising a driving shaft, a tubular driven shaft and acting as a bearing for said driving shaft, a plurality of sets of gears and pinions, one set of gears and pinions being mounted on said driving shaft, means for supporting the opposite set of gears and pinions so as to mesh with the first set of gears and pinions and thereby act as speed multiplying mechanism, one of said gears being connected with said driven shaft, and a second to said driving shaft, a casing surrounding part of said shafts, and said sets of gears and pinions, a worm wheel connected to said driving shaft, and means including worms meshing with said worm wheel for driving said worm wheel.

3. A driving mechanism comprising a pair of power shafts, a worm on each shaft, means for connecting the shafts together so as to operate synchronously, means for connecting power to one of said power shafts, a worm wheel meshing with both of said worms, a driven shaft, a driving shaft connected with said worm wheel, and means for connecting said driving shaft with said driven shaft.

4. A driving mechanism comprising a driving shaft, a driven shaft, means for connecting said driven shaft with the driving shaft so that the driving shaft will move at a different speed from the driven shaft, a worm wheel connected with said driving shaft, a pair of worms for moving said worm wheel, a power shaft for each of said worms, means for connecting said power shafts so that they will rotate in the same direction at the same speed and power will be transmitted from one shaft to the other, and means for connecting power to one of said power shafts.

5. A driving mechanism of the character described comprising a tubular driven shaft, a driving shaft extending through the driven shaft, a worm wheel connected to said driving shaft, a worm for rotating said worm wheel, a worm rigidly secured to said driven shaft, a worm wheel meshing with said last mentioned worm, and means for connecting said last mentioned worm wheel with the first mentioned worm whereby power is transmitted to said first mentioned worm produced by momentum when the driving power for the first mentioned worm is disconnected.

6. A driving mechanism of the character described comprising a driving shaft, a driven shaft, means for connecting the driving shaft with the driven shaft, said means including a speed multiplying mechanism, a worm wheel connected with said driving shaft, a worm meshing with said worm wheel, a power shaft connected with said worm, means for connecting power to said power shaft, a second worm connected with said driven shaft and rotated thereby, a worm wheel meshing with said second worm, and means for connecting said second worm wheel with said power shaft, said connecting means being positioned and proportioned to rotate under the action of said second mentioned worm wheel so that the means engaging said power shaft will be rotated at the same speed as said power shaft, and is connected with said power shaft to transmit power to said power shaft when the first mentioned power has been disconnected from said power shaft.

7. A driving mechanism comprising a power shaft, a worm connected to said power shaft and rotated thereby, a second power shaft, a second worm rotated by said second power shaft, each of said power shafts having a beveled gear adjacent one end, a connecting shaft, a beveled gear adjacent each end of the connecting shaft, meshing with the gears on the power shafts, all of said gears being of the same size whereby all of said shafts will rotate at the same speed, an auxiliary beveled gear on said connecting shaft, a power member positioned to be connected and disconnected with one of said power shafts, a worm wheel meshing with both of said worms, a driving shaft connected with said worm wheel, a driven shaft, power multiplying means interposed between said driving shaft and said driven shaft whereby the driving shaft rotates faster than the driven shaft, an auxiliary worm connected with said driven shaft and rotated thereby, a worm wheel meshing with said auxiliary worm, a beveled gear connected with said last mentioned worm wheel and rotated thereby, a return power shaft, a beveled gear adjacent each end of the return power shaft, one of said beveled gears being operated by said second mentioned worm wheel and the other of said beveled gears being operated by the worm wheel on said connecting shaft whereby when power is disconnected from said power shaft momentum of said driven shaft will be communicated to said connecting shaft and from thence to both of said power shafts, for continuing the rotation of the first mentioned worms and the first mentioned worm wheel under the action of momentum.

8. In a driving mechanism of the character described, a driving shaft, a driven shaft, means connecting said two shafts so that the driven shaft will rotate faster than the driving shaft, a worm wheel connected to said driving shaft, a pair of worms meshing with said worm wheel, and driving said worm wheel, a power shaft connected to each of said worms, a connecting member for connecting the power shafts so that the power shafts will rotate at the same speed, means for connecting power to one of said power shafts, and means for connecting the driven shaft with said power shafts for transmitting momentum to said power shafts when the power is disconnected from the power shafts.

GEORGE DORFFEL.